T. A. CUTTING.
AUTOMATIC ELECTRIC COOKER.
APPLICATION FILED DEC. 26, 1918.
1,326,443.
Patented Dec. 30, 1919.
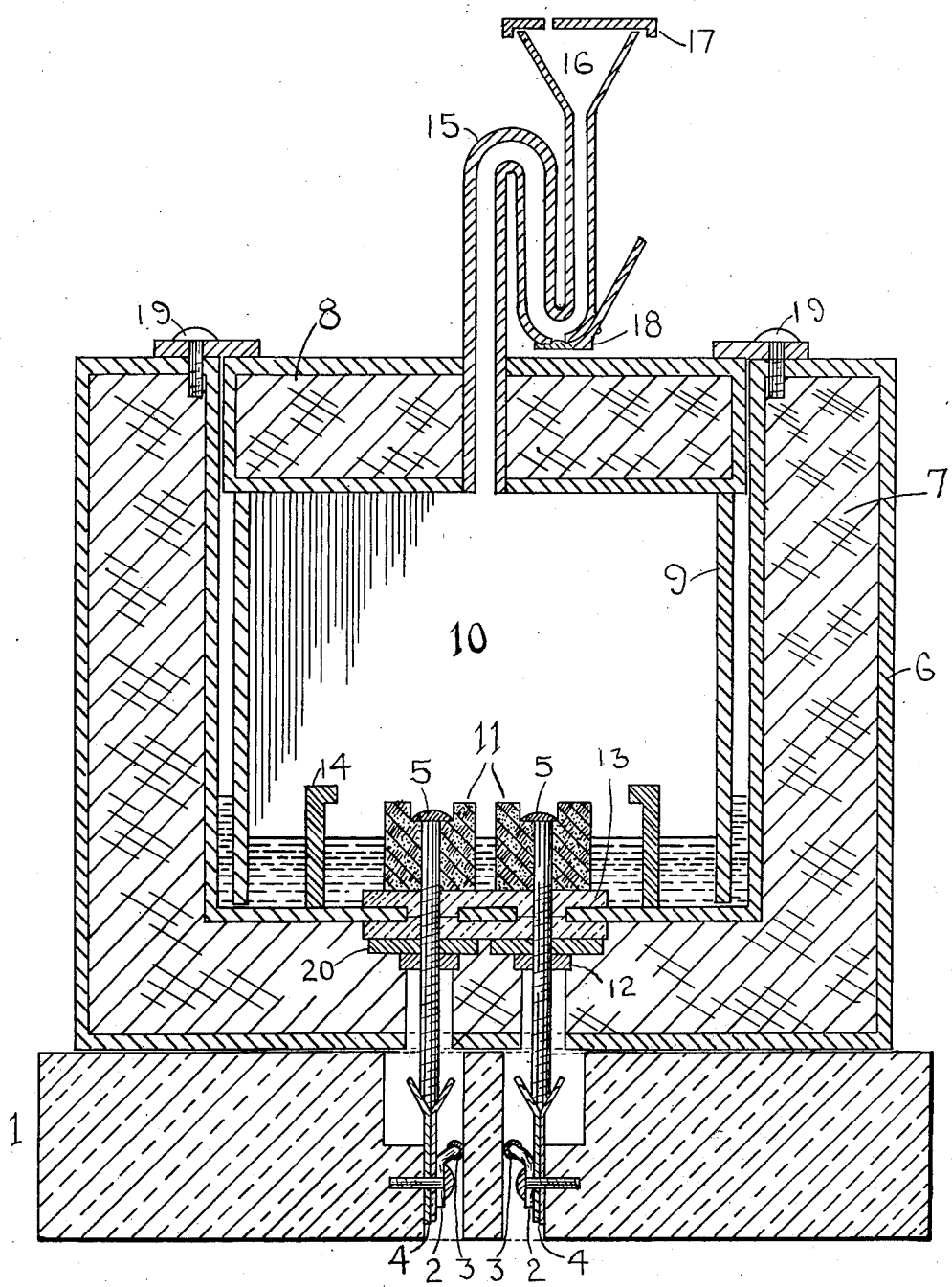
WITNESS
Mary Cooper Cutting.
INVENTOR
Theodore A. Cutting.

UNITED STATES PATENT OFFICE.

THEODORE A. CUTTING, OF CAMPBELL, CALIFORNIA.

AUTOMATIC ELECTRIC COOKER.

1,326,443.                Specification of Letters Patent.    Patented Dec. 30, 1919.

Application filed December 26, 1918. Serial No. 268,233.

*To all whom it may concern:*

Be it known that I, THEODORE A. CUTTING, a citizen of the United States, residing at Campbell, in the county of Santa Clara and State of California, have invented a new and useful Automatic Electric Cooker, of which the following is a specification.

My invention relates to improvements in electric cookers of the type in which heat is produced by an electric current passing from one electrode to another through the resistance of a poorly conducting liquid; and the objects of my invention are, first, to provide a vapor-chamber for the automatic reduction of the current passing between the electrodes when the boiling point is reached; second, to provide a condensing trap allowing the escape of expanding air, but preventing the escape of steam; third, to afford facilities for bolting and insulating the electrodes in the steamer; fourth, to provide a base for connection with an electric circuit; fifth, to provide chemical solutions for stabilizing the conductivity of the liquid; and sixth, to provide walls that will not conduct heat.

I attain these objects by means illustrated in the accompanying drawing, a vertical section of the entire device.

The detachable base 1 is connected to the supply circuit by wires 2 2, which enter the base through the holes 3 3. Springs 4 4 receive the bolts 5 5 of the cooker.

The cylindrical vessel 6 is a double walled utensil packed with heat insulating material, 7, and provided with a cover 8 of the same construction. An inverted cylinder 9 is affixed to the under wall of the cover 8 and constitutes the regulating vapor-chamber 10.

Carbon, or other electrodes 11 are fixed in the bottom of the vessel 6 by the bolts 5 5, and nuts 12 12; and metallic washers 20 20 are used to back the insulating washers 13 13 which are appropriately of semihardened rubber, and are used to insulate the electrodes from each other and from the bottom of the vessel. A perforated cylinder 14 serves both as a guard for the electrodes and as a support for a food container (not shown).

The bent tube, or trap, 15 leads from the vapor chamber 10, and terminates in a small condensing chamber 16. This chamber is fitted with a cover 17, containing a small aperture. The trap is provided with a valve 18. Buttons 19 19 hold in place the cover 8 and the buoyant cylinder 9.

In operation, the electric current enters by the wire 2, passes by means of the spring 4 and bolt 5 to electrode 11, thence through a poorly conducting liquid to the other electrode 11, and by a reverse order out again. The heat generated by the current soon raises the liquid to the boiling point. The air in the chamber 10 expands as it is warmed and escapes through the vent tube 15.

Steam from the heated liquid is condensed on the sides of the container (not shown), occupying the steam chamber 10, until its contents are hot. Then the steam also begins to enter the bent tube 15; but condensation immediately takes place in the tube and in the chamber 16, and water runs down and fills the trap.

With this escape cut off, the steam, as it continues to form, forces the liquid out of the inverted cylinder 9, off the electrodes 11 11, and up in the space between the wall 9 of the steam-chamber 10 and the inner wall 6 of the utensil. This constitutes the regulation, for now that the steam-chamber 10 and all its contents are at the boiling point, and the liquid forced away from the electrodes, the current, unable to leap the gap, drops very low.

The thick, non-heat-conducting walls of the utensil almost prevent the chilling and condensing of the steam, but when any does condense, the liquid reënters the chamber and allows the passage of more current until new steam forms. Thus a constant cooking temperature is indefinitely maintained; and, by means of the automatic regulation, a minimum amount of current is expended.

The valve 18 is for the purpose of emptying the trap, ready to begin anew. It is necessary that the expanding air be permitted to escape, for otherwise it would press the liquid off the electrodes before a cooking temperature was attained and prematurely check the action.

There is no intent to limit the size or position of the steam chamber, for arrangements are more or less satisfactory where the steam-chamber is small and not designed to hold the food-container, but to lie entirely beneath the liquid surface; or in adjoining pipes or chambers. Neither is there intent to limit the shape or position of the electrodes, nor even the number, for a single electrode will suffice, with the walls of the vessel acting as the other, provided the vessel be of conducting material.

Well water ordinarily contains enough lime or other dissolved material to make it sufficiently conductive of the current, but some waters conduct better than others; and for the purpose of definite current control, the use of artificial solutions is included in this specification. Saturated solutions of different chemical substances differ in their power of conducting an electric current. A saturated solution of copper sulfate, for instance, is found to have only about one eighth the conductivity of a saturated solution of sodium chlorid. Each saturated solution has its own specific conductivity, and by the use of any such solution in an electric cooker, the amount of current consumed becomes constant for electrodes of given area and distance. Thus introducing a lump of lime into ordinary water increases its conductivity to such a degree that the effect of the original substances in solution is too small to be of practical importance, and it can be predicted within a sufficiently narrow margin what current the device will consume in any locality. Solutions diluted to one half, or to any other definite proportion, also have definite conductivities and may be used in the same manner.

I am aware that prior to my invention electric cookers have been made using liquid as the heating element, and I do not therefore claim such broadly; but

I claim:

1. The combination in an electric cooker and heater of electrodes, liquid immersing said electrodes, a vapor-chamber containing said electrodes, and an adjoining receptacle disconnected from the walls of said vapor-chamber, so as to permit of removal, and having easy communication with the outside atmosphere to prevent undue steam pressure, and communicating, also, with said vapor-chamber in such a manner that the liquid may pass into the receptacle when forced from said chamber by the formation of vapor, and return upon the condensation of the vapor, substantially as described.

2. In an electric heater, the combination of electrodes, liquid immersing said electrodes, a vapor-chamber containing said electrodes, an adjoining receptacle communicating with said chamber in such a manner that the liquid may flow between said chamber and said receptacle, and thereby automatically regulate the current, and an opening in said vapor-chamber for the limited escape of expanding air and vapor, substantially as described.

3. The combination in an electric liquid heater of a vapor chamber and a trap-escape leading therefrom, essentially as described.

4. A trap, in an electric liquid heater, combined with a condensing chamber terminating said trap, and a valve in the bend of said trap, substantially as described.

5. The combination in an electric liquid heater of an electrode at the bottom of a receptacle, an ample hole in the bottom of said receptacle, a rubber washer covering said hole and separating the electrode from said bottom, a second rubber washer on the outside, a metal washer below the rubber, a bolt passing through all, and a nut drawing the parts together to make a water-tight fitting, said bolt being thereby insulated from the bottom of the receptacle and affording means of connecting with a supply circuit, substantially as described.

6. The combination in an electrolytic heater of a receptacle provided with electrodes, liquid between said electrodes and forming part of the electric path, bolts passing from said electrodes through the bottom of the receptacle, a detachable base, springs within said base to receive the bolts and electric terminals connecting said springs to supply wires, substantially as described.

7. A liquid-heater provided with a regulating steam-chamber, a surrounding double-walled vessel filled with material nonconductive of heat, a cover of the same construction, and buttons for holding said cover and steam-chamber in position, substantially as described.

THEODORE A. CUTTING.

Witnesses:
CATHERINE COOPER,
MARY COOPER CUTTING.